(12) United States Patent
Fan

(10) Patent No.: US 12,107,295 B2
(45) Date of Patent: Oct. 1, 2024

(54) FIREFIGHTING METHOD AND SYSTEM FOR ENERGY STORAGE, AND STORAGE MEDIUM

(71) Applicants: Shenzhen Hithium Energy Storage Technology Co., Ltd., Guangdong (CN); Xiamen Hithium Energy Storage Technology Co., Ltd., Fujian (CN)

(72) Inventor: Shangjie Fan, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/304,912

(22) Filed: Apr. 21, 2023

(65) Prior Publication Data

US 2024/0154242 A1    May 9, 2024

(30) Foreign Application Priority Data

Nov. 7, 2022    (CN) .......................... 202211382002.2

(51) Int. Cl.
*H01M 50/383*    (2021.01)
*H01M 10/42*    (2006.01)
(Continued)

(52) U.S. Cl.
CPC ....... *H01M 50/383* (2021.01); *H01M 10/425* (2013.01); *H01M 10/482* (2013.01);
(Continued)

(58) Field of Classification Search
CPC ............. H01M 50/383; H01M 50/317; H01M 10/425; H01M 10/482; H01M 10/486;
(Continued)

(56) References Cited

U.S. PATENT DOCUMENTS

2021/0245627 A1    8/2021    Ferguson et al.
2022/0149449 A1*   5/2022    Kim ....................... G08B 17/06
(Continued)

FOREIGN PATENT DOCUMENTS

CN    109224344 A    1/2019
CN    110613903 A    12/2019
(Continued)

OTHER PUBLICATIONS

Fuller, E.N. et al. "A new method for prediction of binary gas-phase diffusion coefficients", Industrial and Engineering Chemistry, vol. 58, No. 5, pp. 19-27, published May 1966. (Year: 1966).*
(Continued)

*Primary Examiner* — Stewart A Fraser
*Assistant Examiner* — Lilia Nedialkova
(74) *Attorney, Agent, or Firm* — IP Spring

(57) ABSTRACT

A firefighting method and system for energy storage, and a storage medium are provided in implementations of the present disclosure. The method includes the following. The BMS turns on a first exhaust fan corresponding to a first battery cluster where a first battery module is disposed to exhaust a preset gas from the energy-storage container, when a first gas detector disposed in the first battery module detects the preset gas. The BMS determines whether to turn on a first firefighting apparatus corresponding to the first battery cluster based on a concentration of the preset gas at each moment in a preset period and a temperature of the first battery module at each moment in the preset period, to extinguish a fire at a battery module in the energy-storage container.

18 Claims, 4 Drawing Sheets

(51) Int. Cl.
  *H01M 10/48* (2006.01)
  *H01M 50/317* (2021.01)

(52) U.S. Cl.
  CPC ....... *H01M 10/486* (2013.01); *H01M 50/317* (2021.01); *H01M 2010/4271* (2013.01)

(58) Field of Classification Search
  CPC ......... H01M 10/52; H01M 2010/4271; H01M 2200/00; H01M 2200/10; H01M 2220/10; A62C 3/16; A62C 37/04; A62C 37/44; G08B 17/117; Y02E 60/10
  See application file for complete search history.

(56) References Cited

U.S. PATENT DOCUMENTS

| | | | | |
|---|---|---|---|---|
| 2022/0289030 | A1* | 9/2022 | Pressman | ............ H01M 10/486 |
| 2022/0401770 | A1* | 12/2022 | Sandahl | ................. A62C 37/04 |
| 2022/0407174 | A1* | 12/2022 | Sandahl | .............. H01M 50/204 |

FOREIGN PATENT DOCUMENTS

| | | |
|---|---|---|
| CN | 110620274 A | 12/2019 |
| CN | 113991199 A | 1/2022 |
| CN | 114648849 A | 6/2022 |
| CN | 216773451 U | 6/2022 |
| CN | 114995208 A | 9/2022 |
| CN | 217544801 U | 10/2022 |
| CN | 217589267 U | 10/2022 |

OTHER PUBLICATIONS

CNIPA, First Office Action for Chinese Patent Application No. 202211382002.2, Dec. 14, 2022, 17 pages.

CNIPA, Notice of Allowance for Chinese Patent Application No. 202211382002.2, Dec. 22, 2022, 3 pages.

CNIPA, International Search Report and Written Opinion for International Application No. PCT/CN2023/128814, Jan. 17, 2024, 16 pages.

* cited by examiner

FIREFIGHTING METHOD AND SYSTEM FOR ENERGY STORAGE, AND STORAGE MEDIUM

CROSS-REFERENCE TO RELATED APPLICATIONS

This application claims priority under 35 U.S.C. § 119(a) to Chinese Patent Application No. 202211382002.2, filed Nov. 7, 2022, the entire disclosure of which is incorporated herein by reference.

TECHNICAL FIELD

This disclosure relates to the field of energy-storage firefighting technology, and in particular to a firefighting method and system for energy storage, and a storage medium.

BACKGROUND

Energy-storage firefighting is a problem that should be focused on. Once thermal runaway occurs in a battery, a chain reaction of a fire is easy to occur, which will cause great damage to safety of personnel and property.

At present, firefighting for an energy-storage container generally adopts a container-level total flood gas firefighting solution. When a sensor detects an abnormal temperature, a firefighting controller sends out an alarm signal and turns on a valve to release a gas to a container to extinguish a fire. This firefighting method for energy storage depends on a temperature change, but the temperature change is relatively slow. When the change is relatively fast, the thermal runaway has occurred, and the thermal runaway in a lithium battery is difficult to be suppressed even through the firefighting is performed. Therefore, an existing method for detecting the thermal runaway in the energy-storage container is onefold, and control precision of the thermal runaway is low.

SUMMARY

In a first aspect, a firefighting method for energy storage is provided in implementations of the present disclosure. The method is applied to a firefighting system for energy storage. The firefighting system for energy storage includes multiple temperature sensors, multiple gas detectors, multiple exhaust fans, multiple firefighting apparatuses, and a battery management system (BMS). Multiple battery clusters are disposed in an energy-storage container, and each of the multiple battery clusters includes multiple battery modules. One gas detector and one temperature sensor are disposed in each of the multiple battery modules. The multiple battery clusters, the multiple exhaust fans, and the multiple firefighting apparatuses are in one-to-one correspondence. The method includes the following. The BMS turns on a first exhaust fan corresponding to a first battery cluster where a first battery module is disposed to exhaust a preset gas from the energy-storage container, when a first gas detector disposed in the first battery module detects the preset gas. The first battery module is any one of multiple battery modules in the first battery cluster. The BMS obtains a concentration of the preset gas at each moment in a preset period through the first gas detector and a second gas detector adjacent to the first gas detector as follows. The BMS obtains a first concentration of the preset gas detected by the first gas detector at each moment in the preset period and obtains a second concentration of the preset gas detected by the second gas detector at each moment. The BMS obtains a first relative distance between the second gas detector and the first exhaust fan. The BMS determines a wind speed corresponding to the second gas detector, based on an operating power of the first exhaust fan and the first relative distance between the second gas detector and the first exhaust fan. The BMS determines an initial diffusion rate of the preset gas in air, based on molecular weight of the preset gas and molecular weight of the air. The BMS obtains a relative direction between a diffusion direction of the preset gas diffused to the adjacent gas detector and the first exhaust fan, where the relative direction includes an opposite direction or a reverse direction of the opposite direction. The BMS adjusts the initial diffusion rate of the preset gas in the air based on the wind speed and the relative direction, to obtain a diffusion rate of the preset gas diffused to the second gas detector. The BMS obtains a two-dimensional size of each of the multiple battery modules and a second relative distance between the first gas detector and the second gas detector. The BMS determines the diffusion concentration of the preset gas diffused to the second gas detector at each moment, based on the diffusion rate, the two-dimensional size of each of the multiple battery modules, the second relative distance, and the second concentration. The BMS determines the concentration of the preset gas at each moment in the preset period, based on the diffusion concentration of the preset gas diffused to the second gas detector at each moment and the first concentration of the preset gas. The diffusion concentration of the preset gas diffused to the second gas detector at any one moment satisfies: $C_{total}=C_2+\int_0^d\{[\int_0^{\Delta t}D(t, l)dt]/(ab)\}*dl$; where $C_{total}$ represents the diffusion concentration at any one moment, $C_2$ represents the second concentration at the any one moment, a represents a length in the two-dimensional size of each of the multiple battery modules, b represents a width in the two-dimensional size of each of the multiple battery modules, D(t, l) represents the diffusion rate, d represents the second relative distance, and $\Delta t$ represents a duration between two moments. The BMS obtains a temperature of the first battery module at each moment in the preset period through a first temperature sensor disposed in the first battery module. The BMS determines whether to turn on a first firefighting apparatus corresponding to the first battery cluster based on the concentration of the preset gas at each moment in the preset period and the temperature of the first battery module at each moment in the preset period, to extinguish a fire at a battery module in the energy-storage container.

In a second aspect, a firefighting system for energy storage is provided in implementations of the present disclosure. The firefighting system for energy storage is configured to perform the firefighting method for energy storage in the first aspect. The firefighting system for energy storage includes the multiple temperature sensors, the multiple gas detectors, the multiple exhaust fans, the multiple firefighting apparatuses, and the BMS. The multiple battery clusters are disposed in the energy-storage container, and each of the multiple battery clusters includes the multiple battery modules. One gas detector and one temperature sensor are disposed in each of the multiple battery modules. The multiple battery clusters, the multiple exhaust fans, and the multiple firefighting apparatuses are in one-to-one correspondence. Each of the multiple gas detectors is configured to detect the preset gas. The BMS is configured to turn on the first exhaust fan corresponding to the first battery cluster where the first battery module is disposed to exhaust the preset gas from the energy-storage container, when the first gas detector disposed in the first battery module detects the preset gas. The first battery module is any one of the multiple battery modules in the first battery cluster. The BMS is configured to obtain the concentration of the preset gas at each moment in the preset period through the first gas detector and the second gas detector adjacent to the first gas detector as follows. The BMS is configured to obtain the first concentration of the preset gas detected by the first gas detector at each moment in the preset period and obtain the second concentration of the preset gas detected by the second gas detector at each moment. The BMS is configured to obtain the first relative distance between the second gas detector and the first exhaust fan. The BMS is configured to determine the wind speed corresponding to the second gas detector, based on the operating power of the first exhaust fan and the first relative distance between the second gas detector and the first exhaust fan. The BMS is configured to determine the initial diffusion rate of the preset gas in the air, based on the molecular weight of the preset gas and the molecular weight of the air. The BMS is configured to obtain the relative direction between the diffusion direction of the preset gas diffused to the adjacent gas detector and the first exhaust fan, where the relative direction includes the opposite direction or the reverse direction of the opposite direction. The BMS is configured to adjust the initial diffusion rate of the preset gas in the air based on the wind speed and the relative direction, to obtain the diffusion rate of the preset gas diffused to the second gas detector. The BMS is configured to obtain the two-dimensional size of each of the multiple battery modules and the second relative distance between the first gas detector and the second gas detector. The BMS is configured to determine the diffusion concentration of the preset gas diffused to the second gas detector at each moment, based on the diffusion rate, the two-dimensional size of each of the multiple battery modules, the second relative distance, and the second concentration. The BMS is configured to determine the concentration of the preset gas at each moment in the preset period, based on the diffusion concentration of the preset gas diffused to the second gas detector at each moment and the first concentration of the preset gas. The BMS is configured to obtain the temperature of the first battery module at each moment in the preset period through the first temperature sensor disposed in the first battery module. The BMS is configured to determine whether to turn on a first firefighting apparatus corresponding to the first battery cluster based on the concentration of the preset gas at each moment in the preset period and the temperature of the first battery module at each moment in the preset period, to extinguish the fire at the battery module in the energy-storage container.

In a third aspect, a non-transitory computer-readable storage medium is provided in implementations of the present disclosure. The non-transitory computer-readable storage medium is configured to store computer programs which, when executed by a processor, cause the processor to perform a firefighting method for energy storage, applied to a firefighting system for energy storage. The firefighting system for energy storage includes multiple temperature sensors, multiple gas detectors, multiple exhaust fans, multiple firefighting apparatuses, and a BMS. Multiple battery clusters are disposed in an energy-storage container, and each of the multiple battery clusters includes multiple battery modules. One gas detector and one temperature sensor are disposed in each of the multiple battery modules. The multiple battery clusters, the multiple exhaust fans, and the multiple firefighting apparatuses are in one-to-one correspondence. The method includes the following. The BMS turns on a first exhaust fan corresponding to a first battery cluster where a first battery module is disposed to exhaust a preset gas from the energy-storage container, when a first gas detector disposed in the first battery module detects the preset gas. The first battery module is any one of multiple battery modules in the first battery cluster. The BMS obtains a concentration of the preset gas at each moment in a preset period through the first gas detector and a second gas detector adjacent to the first gas detector as follows. The BMS obtains a first concentration of the preset gas detected by the first gas detector at each moment in the preset period and obtains a second concentration of the preset gas detected by the second gas detector at each moment. The BMS obtains a first relative distance between the second gas detector and the first exhaust fan. The BMS determines a wind speed corresponding to the second gas detector, based on an operating power of the first exhaust fan and the first relative distance between the second gas detector and the first exhaust fan. The BMS determines an initial diffusion rate of the preset gas in air, based on molecular weight of the preset gas and molecular weight of the air. The BMS obtains a relative direction between a diffusion direction of the preset gas diffused to the adjacent gas detector and the first exhaust fan, where the relative direction includes an opposite direction or a reverse direction of the opposite direction. The BMS adjusts the initial diffusion rate of the preset gas in the air based on the wind speed and the relative direction, to obtain a diffusion rate of the preset gas diffused to the second gas detector. The BMS obtains a two-dimensional size of each of the multiple battery modules and a second relative distance between the first gas detector and the second gas detector. The BMS determines the diffusion concentration of the preset gas diffused to the second gas detector at each moment, based on the diffusion rate, the two-dimensional size of each of the multiple battery modules, the second relative distance, and the second concentration. The BMS determines the concentration of the preset gas at each moment in the preset period, based on the diffusion concentration of the preset gas diffused to the second gas detector at each moment and the first concentration of the preset gas. The diffusion concentration of the preset gas diffused to the second gas detector at any one moment satisfies: $C_{total} = C_2 + \int_0^d \{[\int_0^{\Delta t} D(t, l) dt]/(ab)\} * dl$; where $C_{total}$ represents the diffusion concentration at any one moment, $C_2$ represents the second concentration at the any one moment, a represents a length in the two-dimensional size of each of the multiple battery modules, b represents a width in the two-dimensional size of each of the multiple battery modules, $D(t, l)$ represents the diffusion rate, d represents the second relative distance, and $\Delta t$ represents a duration between two moments. The BMS obtains a temperature of the first battery module at each moment in the preset period through a first temperature sensor disposed in the first battery module. The BMS determines whether to turn on a first firefighting apparatus corresponding to the first battery cluster based on the concentration of the preset gas at each moment in the preset period and the temperature of the first battery module at each moment in the preset period, to extinguish a fire at a battery module in the energy-storage container.

BRIEF DESCRIPTION OF THE DRAWINGS

In order to explain technical solutions in implementations of the present disclosure more clearly, the following will give a brief introduction to accompanying drawings which are needed to be used in description of implementations. Apparently, the accompanying drawings in the following description are some implementations of the present disclosure. For those of ordinary skill in the art, other accompanying drawings can be obtained according to these accompanying drawings without creative efforts.

DETAILED DESCRIPTION

Technical solutions of implementations of the present disclosure will be described clearly and completely with reference to accompanying drawings in implementations of the present disclosure. Apparently, implementations described herein are merely some implementations, rather than all implementations, of the present disclosure. Based on implementations of the present disclosure, all other implementations obtained by those of ordinary skill in the art without creative effort shall fall within the protection scope of the present disclosure.

Terms "first", "second", "third", "fourth", and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, a method, a system, a product, or a device including a series of operations or units is not limited to the listed operations or units, it can optionally include other operations or units that are not listed; alternatively, other operations or units inherent to the process, the method, the product, or the device can be included either.

A term "implementation" referred to herein means that a particular feature, structure, or characteristic described in conjunction with implementations may be contained in at least one implementation of the present disclosure. The phrase appearing in various places in the specification does not necessarily refer to the same implementation, nor does it refer an independent or alternative implementation that is mutually exclusive with other implementations. It is expressly and implicitly understood by those skilled in the art that an implementation described herein may be combined with other implementations.

Figure 1:
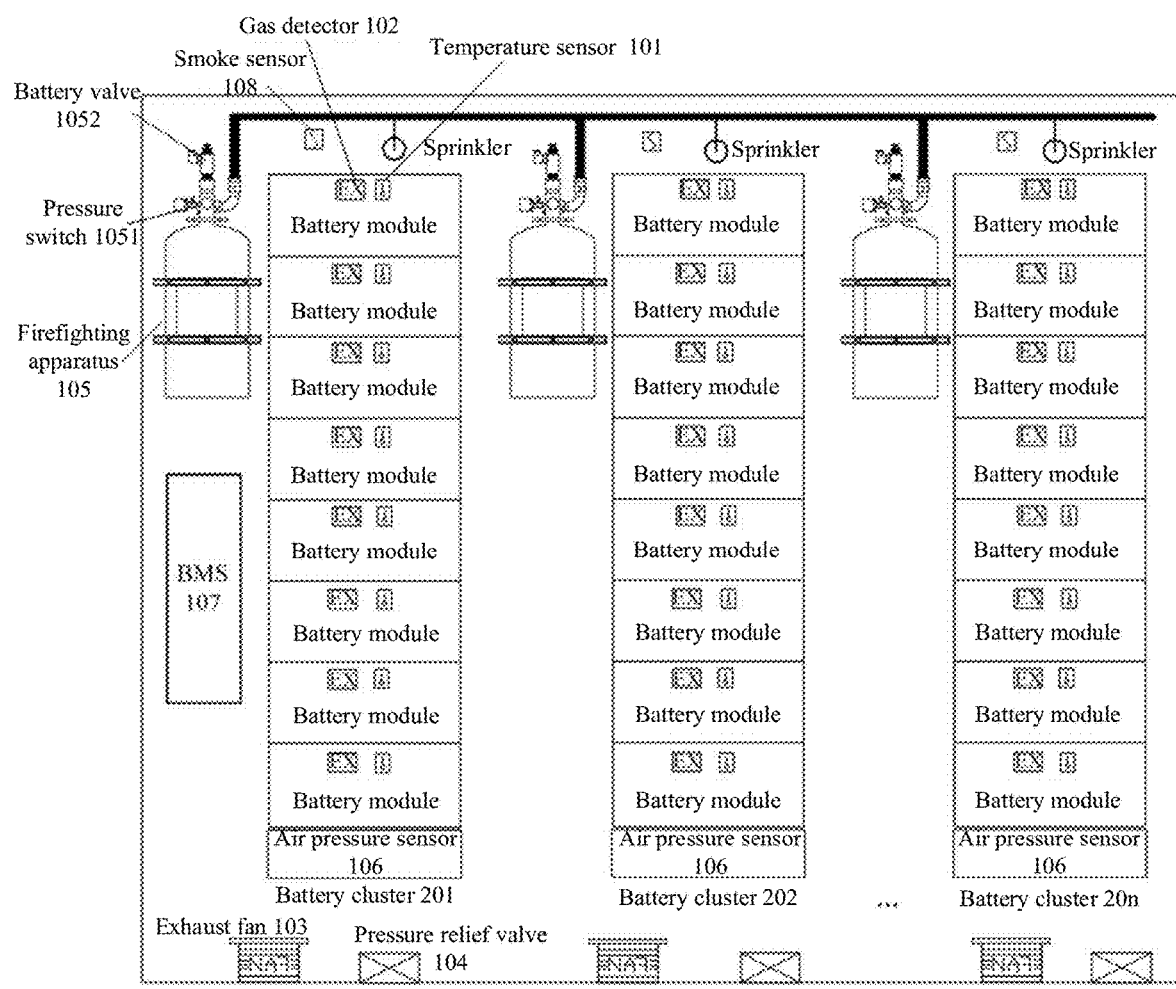
FIG. 1 is a schematic diagram of a firefighting system for energy storage provided in implementations of the present disclosure.

Reference is made to FIG. 1, which is a schematic diagram of a firefighting system for energy storage provided in implementations of the present disclosure. The firefighting system for energy storage includes multiple temperature sensors 101, multiple gas detectors 102, multiple exhaust fans 103, multiple pressure relief valves 104, multiple firefighting apparatuses 105, multiple air pressure sensors 106, and a BMS 107. An energy storage system is configured to perform firefighting on an energy-storage container. The energy-storage container includes multiple battery clusters, such as battery clusters 201, 202, . . . , 20n that are illustrated in FIG. 1, and each of the multiple battery clusters includes multiple battery modules. The multiple temperature sensors 101, the multiple gas detectors 102, the multiple exhaust fans 103, the multiple pressure relief valves 104, the multiple firefighting sensors 105, and the multiple air pressure sensors 106 each can be connected with the BMS 107 by wiring to realize communication, or can realize communication with the BMS 107 by wireless (e.g., Bluetooth).

A fire extinguishing medium is stored in each of the multiple firefighting apparatuses 105. Each of the multiple firefighting apparatuses 105 is provided with a pressure switch 1051 and a battery valve 1052. The pressure switch 1051 is configured to detect and report a pressure in the firefighting apparatus 105 to determine whether a firefighting agent in the firefighting apparatus 105 is available. In general, one firefighting apparatus is configured to perform firefighting on one battery cluster. The BMS can control opening and closing of the battery valve 1052 of each firefighting apparatus 105 to release the fire extinguishing medium in each firefighting apparatus 105, and the fire extinguishing medium is sprayed through a sprinkler of each firefighting apparatus 105 to extinguish a fire at the battery cluster. The fire extinguishing medium may be a heptafluoropropane firefighting agent, a perfluorohexanone firefighting agent, and other fire extinguishing media.

In the present disclosure, each battery cluster is provided with one firefighting apparatus, such that accurate fire extinguishing for each battery cluster can be realized through the firefighting apparatus of each battery cluster. However, in practical application, if a firefighting apparatus of a certain battery cluster is abnormal or a remaining amount of the fire extinguishing medium of the firefighting apparatus of the certain battery cluster is insufficient, other firefighting apparatuses can be used, that is, other firefighting apparatuses can be used as standby firefighting apparatuses, such that the fire extinguishing of the certain battery cluster can be realized through linkage of multiple firefighting apparatuses 105.

Each battery module is provided with one temperature sensor 101 and one gas detector 102 (for example, illustrated by one battery module in the upper left corner of FIG. 1). Each battery cluster is correspondingly provided with one exhaust fan 103, one pressure relief valve 104, and one air pressure sensor 106. Optionally, as illustrated in FIG. 1, the exhaust fan 103 corresponding to each battery cluster may be disposed directly above each battery cluster, or may be disposed directly below each battery cluster, etc., which is not limited in the present disclosure. Optionally, the pressure relief value 104 corresponding to each battery cluster and the air pressure sensor 106 corresponding to each battery cluster may be each disposed at the bottom of each battery cluster, or may be disposed at other positions.

Optionally, as illustrated in FIG. 1, the firefighting system for energy storage may further be provided with a smoke sensor 108 and other various sensors, and sensors included in the firefighting system for energy storage are not described one by one in the present disclosure.

Exemplarily, each gas detector 102 is configured to detect whether a preset gas appears in a battery module where the gas detector is disposed, and if the preset gas is detected, a warning message that the preset gas is detected can be sent to the BMS 107. When a first gas detector disposed in a first battery module detects the preset gas, the BMS 107 is configured to turn on a first exhaust fan corresponding to the first battery cluster where the first battery module is disposed to exhaust the preset gas from the energy-storage container. The first battery module is any one of multiple battery modules in the first battery cluster. The BMS 107 is configured to obtain a concentration of the preset gas at each moment in a preset period through the first gas detector and a second gas detector adjacent to the first gas detector. In the meanwhile, the BMS 107 is further configured to obtain a temperature of the first battery module at each moment in the preset period through a first temperature sensor in the first battery module. The first battery module is a battery module where the first gas detector is disposed. Further, the BMS 107 is configured to determine whether to turn on a first firefighting apparatus corresponding to the first battery cluster based on the concentration of the preset gas at each moment in the preset period and the temperature of the first battery module at each moment in the preset period, to extinguish a fire at a battery module in the energy-storage container.

Figure 2:
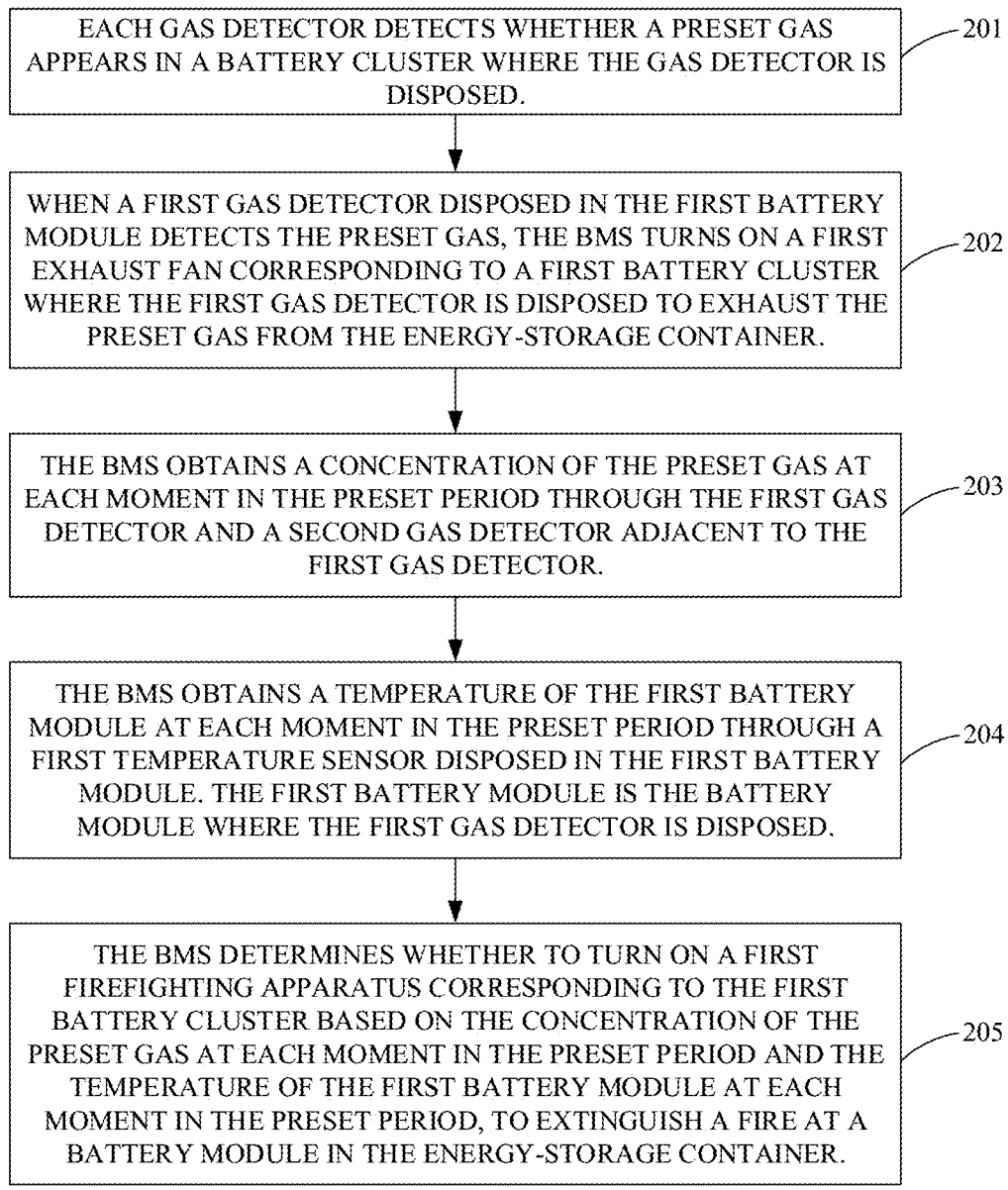
FIG. 2 is a schematic flow diagram of a firefighting method for energy storage provided in implementations of the present disclosure.

Reference is made to FIG. 2, which is a schematic flow diagram of a firefighting method for energy storage provided in implementations of the present disclosure. The method is applied to the firefighting system for energy storage illustrated in FIG. 1. The method includes but is not limited to following operations.

201, each gas detector detects whether a preset gas appears in a battery cluster where the gas detector is disposed.

It should be noted that if a gas detector disposed in a certain battery module detects appearance of the preset gas in the battery module, the BMS will locate the battery module where the gas detector is disposed and locate a battery cluster where the battery module is disposed. The preset gas may be one or more of hydrogen, carbon dioxide ($CO_2$), or the like. In implementations, for example, the preset gas is hydrogen.

202, when a first gas detector disposed in the first battery module detects the preset gas, the BMS turns on a first exhaust fan corresponding to a first battery cluster where the first gas detector is disposed to exhaust the preset gas from the energy-storage container.

The first battery module is any one of multiple battery modules in the first battery cluster.

Exemplarily, when the first gas detector detects the appearance of the preset gas in the first battery module, the first gas detector will feed back a warning signal that the preset gas is detected to the BMS. Accordingly, the BMS locates the first battery cluster where the first battery module is disposed based on the warning signal, determines the first exhaust fan corresponding to the first battery cluster, and then turns on the first exhaust fan to exhaust the preset gas.

203, the BMS obtains a concentration of the preset gas at each moment in the preset period through the first gas detector and a second gas detector adjacent to the first gas detector.

First, it is noted that a start moment of the preset period is a moment when the first gas detector detects the preset gas, and an end moment of the preset period is a moment when thermal runaway occurs in each battery module.

Exemplarity, since the first gas detector detects the preset gas, that is, the first battery module generates the preset gas, the second gas detector adjacent to the first gas detector will also detect the preset gas due to diffusion of a gas and report the concentration of the preset gas detected to the BMS. Therefore, the BMS can determine the concentration of the preset gas at each moment in the preset period through a concentration of the preset gas detected by the first gas detector and a concentration of the preset gas detected the second gas detector.

Figure 3:
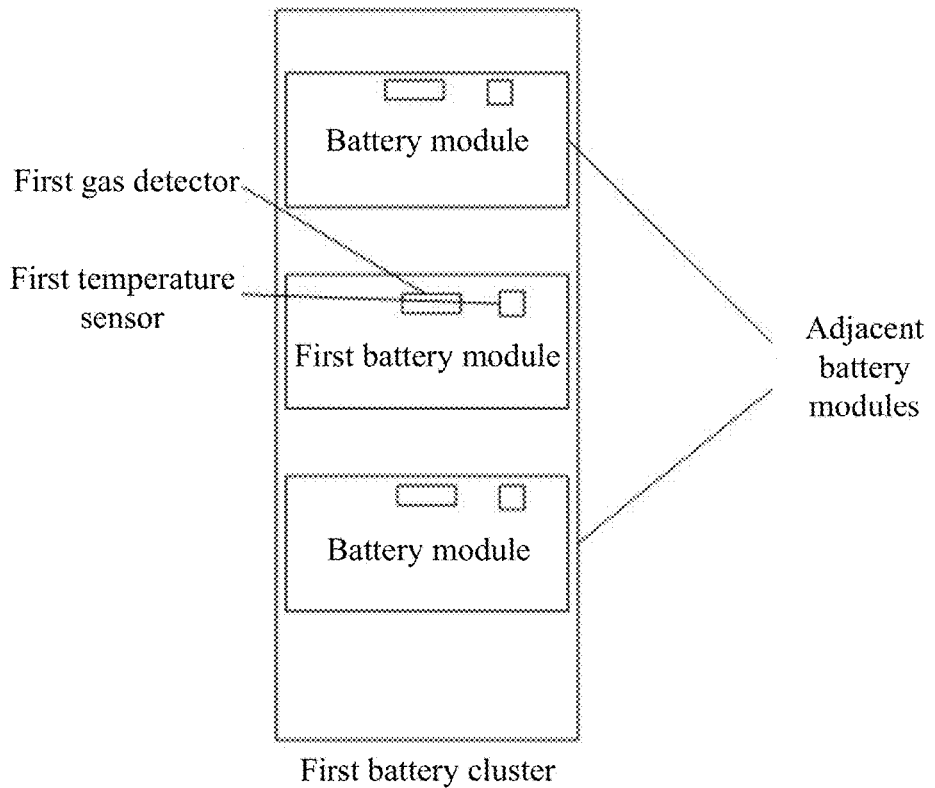
FIG. 3 is a schematic diagram of adjacent battery modules provided in implementations of the present disclosure.

Exemplarily, as illustrated in FIG. 3, the second gas detector in the present disclosure includes a gas detector disposed in a battery module adjacent to the first battery module. Specifically, the number of second gas detectors may be one or more. In the present disclosure, only one adjacent gas detector is taken as an example for description. For example, the second gas detector includes a gas detector adjacent above and/or below the first gas detector. It should be noted that in practical application, if two battery clusters are relatively close to each other, more adjacent gas detectors may be disposed, for example, a left adjacent gas detector and a right adjacent gas detector, which are not limited in the present disclosure.

Exemplarily, the first gas detector will detect a first concentration of the preset gas at each moment in the preset period according to a preset time interval, and report the first concentration detected at each moment to the BMS. The second gas detector will also detect a second concentration of the preset gas at each moment in the preset period according to a preset time interval, and report the gas concentration detected of the preset gas at each moment to the BMS. In this way, the BMS can obtain the first concentration detected by the first gas detector at each moment and the second concentration detected by the second gas detector at each moment.

It should be noted that when the first gas detector detects the preset gas at a certain moment, it means that the battery module where the first gas detector is disposed may be abnormal, and a corresponding first gas detector will detect the preset gas first. However, the preset gas may be diffused in other directions (for example, diffusion of the gas in a vertical direction is only considered in the present disclosure, and diffusion of the gas in other directions is not considered in the present disclosure), so the first concentration of the preset gas detected by the first gas detector at a subsequent moment is not a true concentration of the preset gas, and part of the preset gas has already been diffused out. Therefore, when calculating the concentration of the preset gas, the part of the preset gas that has been diffused out needs to be considered, such that the true concentration of the preset gas generated by the first battery module can be obtained, thereby accurately analyzing whether the first battery module is abnormal.

The following describes how to obtain the true concentration of the preset gas through the second gas detector in detail.

Exemplarily, a diffusion concentration of the preset gas diffused to the second gas detector at each moment is determined, based on a relative direction between the second gas detector and the first gas detector and the second concentration of the preset gas detected by the second gas detector.

Optionally, the relative distance between the second gas detector and the first exhaust fan is obtained, for example, a position of the second gas detector in the first battery cluster can be determined, and based on the position of the second gas detector in the first battery cluster, the relative distance can be determined. A wind speed corresponding to the second gas detector is determined, based on a relative distance between the second gas detector and the first exhaust fan and an operating power of the first exhaust fan. In other words, the wind speed corresponding to the second gas detector is determined based on a law of gradual attenuation of wind speed. Optionally, one wind-speed detector may also be disposed on one side edge of each battery module, and the wind speed corresponding to the second gas detector can be directly obtained by the wind speed detector of the battery module where the second gas detector is disposed.

Further, an initial diffusion rate of the preset gas in air is determined, based on a molecular weight of the preset gas and a molecular weight of the air. Specifically, an air pressure of the first battery cluster, that is, an air pressure in the energy-storage container, can be obtained by a first air pressure sensor in the multiple air pressure sensors corresponding to the first battery cluster. Then, the temperature of the first battery module is obtained by the first temperature sensor, and a thermodynamic temperature, that is, an absolute temperature, of the first battery module is determined based on the temperature of the first battery module. Finally, the initial diffusion rate of the preset gas is determined, based on the molecular weight of the preset gas and the molecular weight of the air, the air pressure of the first battery cluster, the thermodynamic temperature of the first battery module, and a liquid gram molar volume and a molecular weight of the preset gas at a normal boiling point, and a liquid gram molar volume and a molecular weight of the air at a normal boiling point.

Exemplarily, the initial diffusion rate of the preset gas can be expressed by formula (1):

$$D_1 = \partial * \frac{T^{3/2}}{P*\left(V_1^{1/3}+V_2^{1/3}\right)^2} * \sqrt{\frac{1}{\mu_1}+\frac{1}{\mu_2}},$$

where $D_1$ represents the initial diffusion rate, $\partial$ represents a preset hyper-parameter, P represents the air pressure of the first battery cluster, T represents the thermodynamic temperature of the first battery module, $V_1$ represents the liquid gram molar volume of the preset gas at the normal boiling point, $\mu_1$ represents the molecular weight of the preset gas at the normal boiling point, $V_2$ represents the liquid gram molar volume of the air at the normal boiling point, and $\mu_2$ represents the molecular weight of the air at the normal boiling point.

Further, the relative direction between the second gas detector and the first gas detector is obtained, and the relative direction is an upward direction or a downward direction. Then, the initial diffusion rate of the preset gas in the air is adjusted based on the wind speed corresponding to the second gas detector and the relative direction, to obtain a diffusion rate of the preset gas diffused to the second gas detector. Specifically, a relative direction between the diffusion direction of the preset gas diffused to the second gas detector and an exhaust fan is determined based on the relative direction between the second gas detector and the first gas detector, and the relative direction between the diffusion direction of the preset gas diffused to the second gas detector and the exhaust fan includes an opposite direction and a reverse direction of the opposite direction. A penalty coefficient of the preset gas diffused to the second gas detector is determined, based on the relative direction between the diffusion direction of the preset gas and the exhaust fan. Specifically, the penalty coefficient of the preset gas diffused to the second gas detector can be determined, based on a mapping relationship between a gas type, the wind speed, the relative direction, and the penalty coefficient. The initial diffusion rate of the preset gas in the air is adjusted based on the penalty coefficient, to obtain the diffusion rate of the preset gas diffused to the second gas detector. In other words, the diffusion rate of the preset gas diffused to the second gas detector is obtained by summing the penalty coefficient and the initial diffusion rate.

It should be noted that when the relative direction is the opposite direction, a value of the penalty coefficient is determined to be negative, and when the relative direction is the reverse direction of the opposite direction, the value of the penalty coefficient is determined to be positive.

Further, the diffusion concentration of the preset gas diffused to the second gas detector at each moment can be determined, based on the diffusion rate of the preset gas diffused to the second gas detector.

Figure 4:
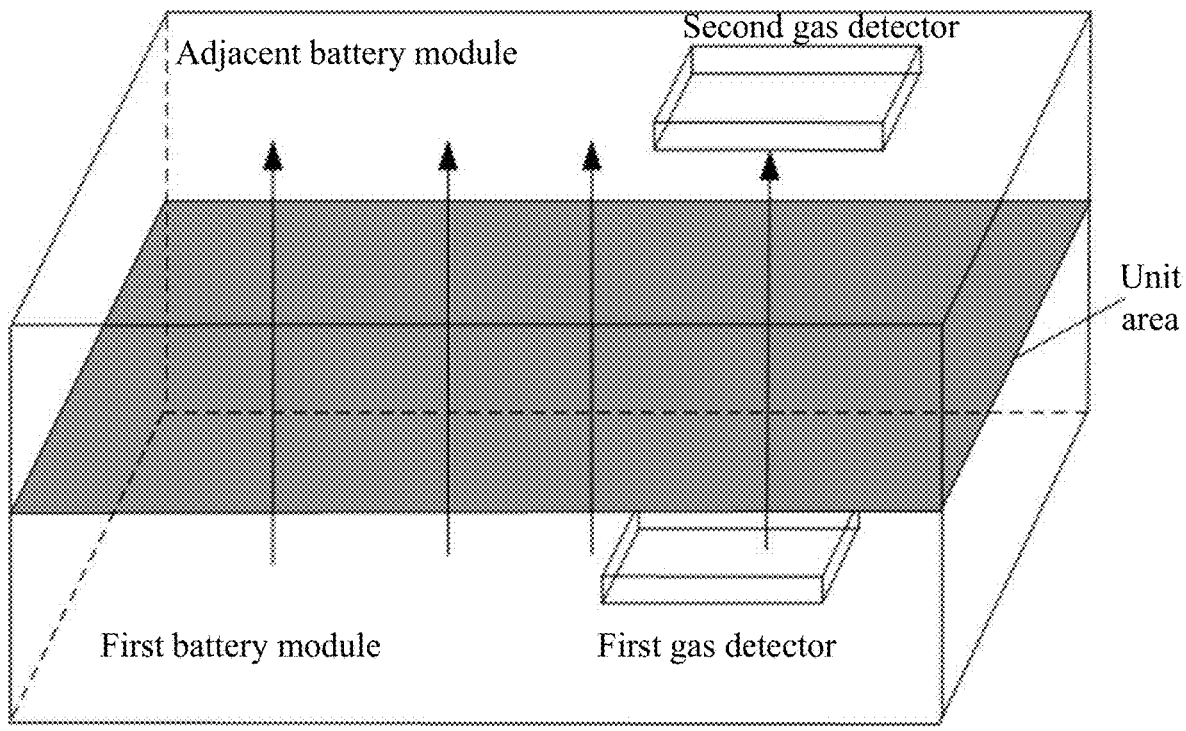
FIG. 4 is a schematic diagram illustrating diffusion of a preset gas provided in implementations of the present disclosure.

Specifically, a two-dimensional size (i.e., length and width) of each battery module and a second relative distance between the first gas detector and the adjacent gas detector are obtained. The diffusion concentration of the preset gas diffused to the second gas detector at each moment is determined, based on the diffusion rate, the two-dimensional size of each battery module, the second relative distance, and the second concentration. Exemplarily, as illustrated in FIG. 4, a concentration of the preset gas diffused per unit area at each moment is determined, based on the two-dimensional size of each battery module (sizes of the battery modules are the same in the present disclosure) and the diffusion rate of the preset gas diffused to the second gas detector. Then, a concentration of the preset gas diffused to a space defined by the first battery module and an adjacent battery module is determined, based on the second relative distance. Finally, the diffusion concentration of the preset gas diffused to the second gas detector at each moment is obtained by summing the concentration of the preset gas diffused to the space defined by the first battery module and the adjacent battery module and the second concentration.

Exemplarily, the diffusion concentration at any one moment can be expressed by formula (2): $C_{total}=C_2+\int_0^d\{[\int_0^{\Delta t} D(t, l)dt]/(ab)\}*dl$, where $C_{total}$ represents the diffusion concentration at any one moment, $C_2$ represents the second concentration at the any one moment, a represents a length in the two-dimensional size of each battery module, b represents a width in the two-dimensional size of each battery module, D(t, l) represents the diffusion rate, d represents the second relative distance, and $\Delta t$ represents a duration between two moments.

Finally, the concentration of the preset gas at each moment in the preset period is determined, based on the diffusion concentration of the preset gas diffused to the second gas detector at each moment in the preset gas and the first concentration of the preset gas. In other words, the concentration of the preset gas at each moment in the preset period is obtained by summing the diffusion concentration of the preset gas diffused to the second gas detector at each moment and the first concentration. It should be noted that if the number of second gas detectors is multiple, a diffusion concentration of the preset gas diffused to each of the multiple second gas detectors at each moment can be obtained respectively. Then, the concentration of the preset gas at each moment in the preset period is obtained by summing the diffusion concentration corresponding to each of the multiple second gas detectors and the first concentration.

204, the BMS obtains a temperature of the first battery module at each moment in the preset period through a first temperature sensor disposed in the first battery module. The first battery module is the battery module where the first gas detector is disposed.

Exemplarily, the BMS can obtain the temperature of the first battery module at each moment in the preset period from the first temperature sensor after determining that the first gas detector detects the preset gas.

205, the BMS determines whether to turn on a first firefighting apparatus corresponding to the first battery cluster based on the concentration of the preset gas at each moment in the preset period and the temperature of the first battery module at each moment in the preset period, to extinguish a fire at a battery module in the energy-storage container.

Exemplarily, whether the first battery module is abnormal is determined, based on the concentration of the preset gas at each moment in the preset period and the temperature of the first battery module at each moment in the preset period.

Optionally, in an implementation of the present disclosure, the BMS can determine whether the battery module is abnormal by monitoring the concentration of the preset gas. Specifically, if the BSM detects that the concentration of the preset gas at one moment in the preset period is greater than a first threshold, the first battery module is determined to be abnormal. More specifically, if the BSM detects that the concentration of the preset gas increases in the preset period and a concentration at a certain moment is greater than the first threshold, the first battery module is determined to be abnormal.

Optionally, in another implementation of the present disclosure, the BMS can determine whether the battery module is abnormal by monitoring a concentration change rate of the concentration of the preset gas. Specifically, if the BMS detects that the concentration change rate of the concentration of the preset gas at a certain moment in the preset period is greater than a second threshold value, the first battery module is determined to be abnormal. More specifically, the BMS determines the concentration change rate of the concentration of the preset gas at each moment in the preset period, based on the concentration of the preset gas at each moment in the preset period. If the concentration change rate increases and the concentration change rate at one moment in the preset period is greater than the second threshold, the first battery module is determined to be abnormal.

Further, in yet another implementation of the present disclosure, to improve precision and accuracy of detection, if the BMS detects that the concentration of the preset gas increases in the preset period, the concentration change rate of the preset gas at each moment in the preset period increases progressively, the concentration at a certain moment is greater than the first threshold, and the concentration change rate at the certain moment is greater than the second threshold, the first battery module is determined to be abnormal.

Optionally, in yet another implementation of the present disclosure, the BMS can determine whether the battery module is abnormal by monitoring the temperature of the battery module. Specifically, after the first gas detector detects the preset gas, the BMS can monitor the temperature of the preset gas at each moment in the preset period, and if the temperature at one moment is greater than a third threshold, the first battery module is determined to be abnormal. More specifically, the first battery module is determined to be abnormal when the temperature of the first battery module increases and the temperature at one moment in the preset period is greater than the third threshold.

Optionally, in yet another implementation of the present disclosure, the BMS can further determine whether the battery module is abnormal by monitoring a temperature change rate of the temperature of the battery module. Specifically, if the BMS detects that the temperature change rate of the preset gas at one moment in the preset period is greater than a fourth threshold, the first battery module is determined to be abnormal. More specifically, the first battery module is determined to be abnormal if the BMS detects that the temperature change rate increases and the temperature change rate at one moment in the preset period is greater than the fourth threshold.

Further, in yet another implementation of the present disclosure, to improve the precision and accuracy of detection, if the BMS detects that the temperature of the first battery module increases progressively, the temperature change rate of the temperature of the first battery module increases at each moment in the preset period, the temperature at a certain moment in the preset period is greater than the third threshold value, and the temperature change rate at the certain moment is greater than the fourth threshold value, the first battery module is determined to be abnormal.

Further, in yet another implementation of the present disclosure, the BMS can further comprehensively determine whether the battery module is abnormal by simultaneously monitoring the concentration of the preset gas in the battery module, the concentration change rate of the concentration of the preset gas, the temperature of the battery module, and the temperature change rate of the temperature of the battery module.

In an implementation of the present disclosure, whether the battery module is abnormal can also be determined by curve fitting. Optionally, the concentration of the preset gas at each moment in the preset period can be fitted to obtain a concentration curve. The concentration curve is fitted with a concentration template curve before thermal runaway occurs in the first battery module to obtain a first fitting error. If the first fitting error is less than a sixth threshold, the first battery module is determined to be abnormal. Optionally, the concentration change rate of the concentration of the preset gas at each moment in the preset period can be fitted to obtain a concentration-change-rate curve. Similarly, the concentration-change-rate-curve can be fitted with a template curve to obtain a second fitting error. If the second fitting error is less than a seventh threshold, the first battery module is determined to be abnormal. Further, after obtaining the first fitting error and the second fitting error, the first fitting error can be combined with the second fitting error to obtain a first target fitting error, and whether the first battery module is abnormal is determined based on the first target fitting error.

Similarly, curve fitting can be performed on the temperature curve of the first battery module at each moment in the preset period, and whether the first battery module is abnormal can be determined through a fitting error, which will not be described in detail.

Further, after determining that the first battery module is abnormal, in order to ensure safety and stability of the energy-storage container, power supply to the multiple battery clusters can be cut off. In practical application, only the power supply to the first battery module can be cut off.

It should be noted that, if any of the above situations does not occur in the preset period, the first battery module is determined to be normal, the preset gas detected by the first gas detector may be false detection, or the preset gas may be generated by accident. Therefore, after the preset gas is exhausted from the container by the first exhaust fan, that is, when the preset gas is not detected by the first gas detector, the first exhaust fan is turned off and the power supply to the multiple battery clusters is resumed.

It can be seen that in the present disclosure, when the firefighting system for energy storage detects the preset gas before the fire, the firefighting system for energy storage will turn on the exhaust fan based on the temperature of the battery module and the gas concentration, to exhaust the preset gas from the container to avoid the fire at the battery, thereby preventing the thermal runaway.

Further, after the power supply to the multiple battery clusters is cut off, the BMS continues to detect the temperature of the first battery module through the first temperature sensor. If the temperature of the first battery module is detected to still increase, for example, the temperature of the first battery module still presents an increasing trend after the preset period, the thermal runaway is determined to occur in the first battery module. Here, the BMS turns off the first exhaust fan and controls the first firefighting apparatus to release the fire extinguishing medium to the first battery cluster to completely cover the first battery cluster, thereby extinguishing the fire at the first battery module where the thermal runaway occurs.

It can be seen that in implementations of the present disclosure, each battery module is provided with a corresponding gas detector and a corresponding temperature sensor. Since detection of a gas is more sensitive than detection of a temperature change, whether the battery module is abnormal can be found earlier by detecting, through the gas detector, whether the preset gas is generated in each battery module. In addition, in the present disclosure, each battery module is provided with one gas detector, such that monitoring of the energy-storage container is more delicate, and whether a battery in the energy-storage container is abnormal can be determined more accurately. Further, in the present disclosure, each battery module is further provided with one temperature sensor, such that when a certain battery module is detected to generate the preset gas, a temperature of the battery module can be obtained through a temperature sensor corresponding to the battery module, and whether thermal runaway will occur in the battery module can be further determined through the temperature of the battery module. Therefore, in the present disclosure, one gas detector and one temperature sensor are disposed in each battery module, such that abnormalities of the battery module can be found in time, and whether the thermal runaway occurs in the battery module can be determined more in time and accurately, thereby improving safety of energy-storage firefighting.

Figure 5:
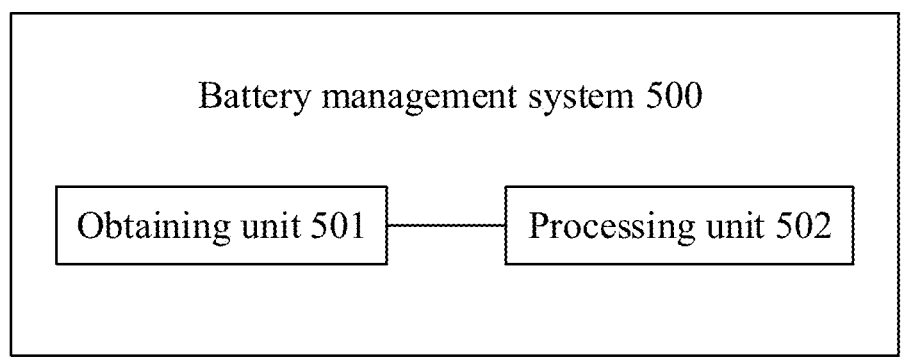
FIG. 5 is a block diagram of functional units of a battery management system (BMS) provided in implementations of the present disclosure.

Reference is made to FIG. 5, which is a block diagram of functional units of a BMS provided in implementations of the present disclosure. A BMS 500 is disposed in the above firefighting system for energy storage. The BMS 500 includes an obtaining unit 501 and a processing unit 502. The processing unit 502 is configured to turn on a first exhaust fan corresponding to a first battery cluster where a first battery module is disposed to exhaust a preset gas from the energy-storage container, when a first gas detector disposed in the first battery module detects the preset gas. The first battery module is any one of multiple battery modules in the first battery cluster. The obtaining unit 501 is configured to obtain a concentration of the preset gas at each moment in a preset period through the first gas detector and a second gas detector adjacent to the first gas detector. The obtaining unit 501 is configured to obtain a temperature of the first battery module at each moment in the preset period through a first temperature sensor disposed in the first battery module. The processing unit 502 is configured to determine whether to turn on a first firefighting apparatus corresponding to the first battery cluster based on the concentration of the preset gas at each moment in the preset period and the temperature of the first battery module at each moment in the preset period, to extinguish a fire at a battery module in the energy-storage container.

In an implementation of the present disclosure, in terms of determining whether to turn on the first firefighting apparatus corresponding to the first battery cluster based on the concentration of the preset gas at each moment in the preset period and the temperature of the first battery module at each moment in the preset period, the processing unit 502 is specifically configured to determine whether the first battery module is abnormal based on the concentration of the preset gas at each moment in the preset period and the temperature of the first battery module at each moment in the preset period. When the first battery module is abnormal, the processing unit 502 is configured to cut off power supply to the multiple battery clusters. On condition that the power supply to the multiple battery clusters is cut off, when an increase in the temperature of the first battery module is detected through the first temperature sensor, the processing 502 is configured to determine that thermal runaway occurs in the first battery module, turn off the first exhaust fan, and control the first firefighting apparatus to release a fire extinguishing medium to the first battery cluster.

In an implementation of the present disclosure, in terms of determining whether the first battery module is abnormal, based on the concentration of the preset gas at each moment in the preset period and the temperature of the first battery module at each moment in the preset period, the processing unit 502 is specifically configured to determine that the first battery module is abnormal, when the concentration of the preset gas increases and a concentration at one moment in the preset period is greater than a first threshold; and/or determine a concentration change rate of the concentration of the preset gas at each moment in the preset period, based on the concentration of the preset gas at each moment in the preset period; and determine that the first battery module is abnormal, when the concentration change rate increases and a concentration change rate at one moment in the preset period is greater than a second threshold; and/or determine that the first battery module is abnormal, when the temperature of the first battery module increases and a temperature at one moment in the preset period is greater than a third threshold; and/or determine a temperature change rate of the temperature of the first battery module, based on the temperature of the first battery module at each moment in the preset period; and determine that the first battery module is abnormal, when the temperature change rate increases and a temperature change rate at one moment in the preset period is greater than a fourth threshold.

In an implementation of the present disclosure, the firefighting system for energy storage further includes multiple air pressure sensors and multiple pressure relief valves. The multiple air pressure sensors, the multiple pressure relief valves, and the multiple battery clusters are in one-to-one correspondence. The obtaining unit 501 is further configured to obtain an air pressure of the energy-storage container at each moment in the preset period through a first air pressure sensor in the multiple air pressure sensors corresponding to the first battery cluster. The processing unit 502 is further configured to turn off the first exhaust fan and turn on a first pressure relief valve corresponding to the first battery cluster to reduce the air pressure of the energy-storage container, when the air pressure at any moment is greater than a fifth threshold.

In an implementation of the present disclosure, in terms of obtaining the concentration of the preset gas at each moment in the preset period through the first gas detector and the second gas detector adjacent to the first gas detector, the processing unit 502 is specifically configured to obtain a first concentration of the preset gas detected by the first gas detector at each moment in the preset period and obtain a second concentration of the preset gas detected by the second gas detector at each moment; determine a diffusion concentration of the preset gas diffused to the second gas detector at each moment, based on a relative direction between the second gas detector and the first gas detector and the second concentration; and determine the concentration of the preset gas at each moment in the preset period, based on the diffusion concentration of the preset gas diffused to the second gas detector at each moment and the first concentration of the preset gas.

In an implementation of the present disclosure, in terms of determining the diffusion concentration of the preset gas diffused to the second gas detector at each moment, based on the relative direction between the second gas detector and the first gas detector and the second concentration, the processing unit 502 is specifically configured to obtain a first relative distance between the second gas detector and the first exhaust fan; determine a wind speed corresponding to the second gas detector, based on an operating power of the first exhaust fan and the first relative distance between the second gas detector and the first exhaust fan; determine an initial diffusion rate of the preset gas in air, based on the molecular weight of the preset gas and the molecular weight of the air; obtain a relative direction between a diffusion direction of the preset gas diffused to the adjacent gas detector and the first exhaust fan, where the relative direction includes an opposite direction or a reverse direction of the opposite direction; adjust the initial diffusion rate of the preset gas in the air based on the wind speed and the relative direction, to obtain a diffusion rate of the preset gas diffused to the second gas detector; obtain a two-dimensional size of each of the multiple battery modules and a second relative distance between the first gas detector and the second gas detector; and determine the diffusion concentration of the preset gas diffused to the second gas detector at each moment, based on the diffusion rate, the two-dimensional size of each of the multiple battery modules, the second relative distance, and the second concentration.

In an implementation of the present disclosure, the diffusion concentration of the preset gas diffused to the second gas detector at any one moment satisfies: $C_{total} = C_2 + \int_0^d \{ [\int_0^{\Delta t} D(t, l) dt]/(ab) \} * dl$, where $C_{total}$ represents the diffusion concentration at any one moment, $C_2$ represents the second concentration at the any one moment, a represents a length in the two-dimensional size of each of the multiple battery modules, b represents a width in the two-dimensional size of each of the multiple battery modules, $D(t, l)$ represents the diffusion rate, d represents the second relative distance, and $\Delta t$ represents a duration between two moments.

Figure 6:
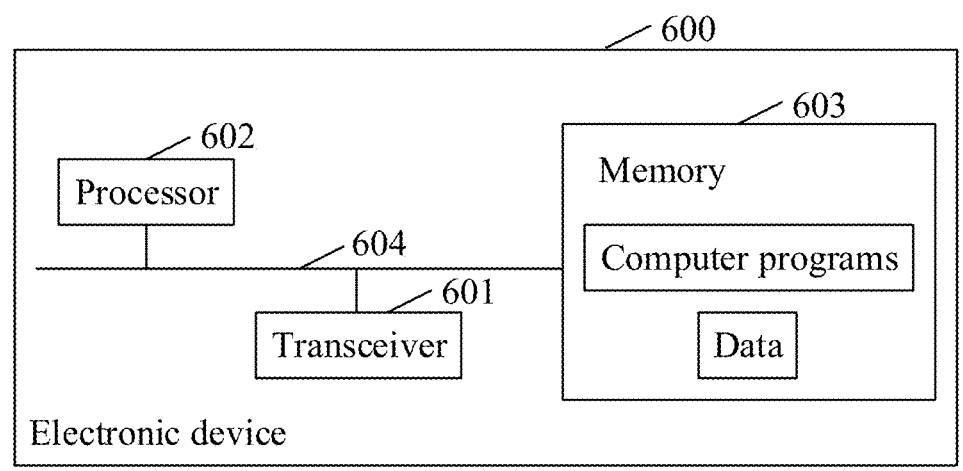
FIG. 6 is a schematic structural diagram of an electronic device provided in implementations of the present disclosure.

Reference is made to FIG. 6, which is a schematic structural diagram of an electronic device provided in implementations of the present disclosure. As illustrated in FIG. 6, an electronic device 600 includes a transceiver 601, a processor 602, and a memory 603. The transceiver 601, the processor 602, and the memory 603 are connected with one another via a bus 604. The memory 603 is configured to store computer programs and data, and the data stored in the memory 603 can be transmitted to the processor 602.

The processor 602 is configured to read computer programs in the memory 603 and perform following operations.

In some possible implementations, the processor is configured to perform following operations. The processor is configured to turn a first exhaust fan corresponding to a first battery cluster where a first battery module is disposed to exhaust a preset gas from the energy-storage container, when a first gas detector disposed in the first battery module detects the preset gas, where the first battery module is any one of multiple battery modules in the first battery cluster; control the transceiver 601 to obtain a concentration of the preset gas at each moment in a preset period through the first gas detector and a second gas detector adjacent to the first gas detector; control the transceiver 601 to obtain a temperature of the first battery module at each moment in the preset period through a first temperature sensor disposed in the first battery module; determine whether to turn on a first firefighting apparatus corresponding to the first battery cluster based on the concentration of the preset gas at each moment in the preset period and the temperature of the first battery module at each moment in the preset period, to extinguish a fire at a battery module in the energy-storage container.

Specifically, the above transceiver 601 may be the obtaining unit 501 of the BMS 500 in implementations illustrated in FIG. 5, and the above processor 602 may be the processing unit 502 of the BMS 500 in implementations illustrated in FIG. 5.

A non-transitory computer-readable storage medium is further provided in implementations of the present disclosure. The non-transitory computer-readable storage medium is configured to store computer programs. The computer programs are executed by a processor to implement some or all of operations of any of the firefighting method for energy storage as described in the above method implementations.

A computer program product is further provided in implementations of the present disclosure. The computer program product includes a non-transitory computer-readable storage medium storing computer programs. A computer is operable with the computer to perform some or all of operations of any of the firefighting method for energy storage as described in the above method implementations.

It should be noted that for the sake of simplicity, the above method implementations are described as a series of action combinations. However, it will be appreciated by those skilled in the art that the present disclosure is not limited by the sequence of actions described. According to the present disclosure, some operations may be performed in other orders or simultaneously. Besides, it will be appreciated by those skilled in the art that implementations described in the specification are optional implementations, and the actions and modules involved are not necessarily essential to the present disclosure.

In the above implementations, the description of each implementation has its own emphasis. For the parts not described in detail in one implementation, reference may be made to related descriptions in other implementations.

It will be appreciated that the apparatuses disclosed in some implementations provided in the present disclosure may also be implemented in various other manners. For example, the above described apparatus implementations are merely exemplary, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interfaces, apparatuses, or units, and may be electrical, or otherwise.

Separated units as illustrated may or may not be physically separated. Components or parts displayed as units may or may not be physical units, and may reside at one location or may be distributed to multiple network units. Some or all of the units may be selectively adopted according to practical needs to achieve purposes of the present disclosure.

In addition, the functional units in various implementations of the present disclosure may be integrated into one processing unit, or each unit may be physically present, or two or more units may be integrated into one unit. The above unit integrated may be implemented in the form of hardware or in the form of a software functional unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and the like) to perform all or part of the steps described in the various implementations of the present disclosure. The memory includes various medium capable of storing program codes, such as a universal serial bus (USB) flash disk, a read-only memory (ROM), a random access memory (RAM), a removable hard disk, disk, compact disc (CD), or the like.

It should be noted that a person skilled in the art may understand that all or some of the processes in the methods of the above implementations can be realized by using computer programs to instruct corresponding hardware. The programs may be stored in a non-transient computer-readable storage medium. The storage medium may be a flash disk, a ROM, a RAM, a magnetic disk, a compact disc, or the like.

Implementations of the present disclosure have been described in detail. The principles and implementations of the present disclosure have been elaborated with specific examples herein. The above illustration of implementations is only used to help to understand methods and core ideas of the present disclosure. At the same time, for those skilled in the art, according to ideas of the present disclosure, there will be changes in specific implementations and application scope. In summary, contents of this specification should not be understood as limitation on the present disclosure.

What is claimed is:

1. A firefighting method for energy storage, applied to a firefighting system for energy storage, wherein the firefighting system for energy storage comprises a plurality of temperature sensors, a plurality of gas detectors, a plurality of exhaust fans, a plurality of firefighting apparatuses, and a battery management system (BMS); a plurality of battery clusters are disposed in an energy-storage container, and each of the plurality of battery clusters comprises a plurality of battery modules, wherein one gas detector and one temperature sensor are disposed in each of the plurality of battery modules; the plurality of battery clusters, the plurality of exhaust fans, and the plurality of firefighting apparatuses are in one-to-one correspondence; and the method comprises:

turning on, by the BMS, a first exhaust fan corresponding to a first battery cluster where a first battery module is disposed to exhaust a preset gas from the energy-storage container, when a first gas detector disposed in the first battery module detects the preset gas, wherein the first battery module is any one of a plurality of battery modules in the first battery cluster;

obtaining, by the BMS, a concentration of the preset gas at each moment in a preset period through the first gas detector and a second gas detector adjacent to the first gas detector, wherein obtaining, by the BMS, the concentration of the preset gas at each moment in the preset period through the first gas detector and the second gas detector adjacent to the first gas detector comprises:

obtaining a first concentration of the preset gas detected by the first gas detector at each moment in the preset period and obtaining a second concentration of the preset gas detected by the second gas detector at each moment;

obtaining a first relative distance between the second gas detector and the first exhaust fan;

determining a wind speed corresponding to the second gas detector, based on an operating power of the first exhaust fan and the first relative distance between the second gas detector and the first exhaust fan;

determining an initial diffusion rate of the preset gas in air, based on molecular weight of the preset gas and molecular weight of the air;

obtaining a relative direction between a diffusion direction of the preset gas diffused to the second gas detector and the first exhaust fan, wherein the relative direction comprises an opposite direction or a reverse direction of the opposite direction;

adjusting the initial diffusion rate of the preset gas in the air based on the wind speed and the relative direction, to obtain a diffusion rate of the preset gas diffused to the second gas detector;

obtaining a two-dimensional size of each of the plurality of battery modules and a second relative distance between the first gas detector and the second gas detector;

determining the diffusion concentration of the preset gas diffused to the second gas detector at each moment, based on the diffusion rate, the two-dimensional size of each of the plurality of battery modules, the second relative distance, and the second concentration; and determining the concentration of the preset gas at each moment in the preset period, based on the diffusion concentration of the preset gas diffused to the second gas detector at each moment and the first concentration of the preset gas;

obtaining, by the BMS, a temperature of the first battery module at each moment in the preset period through a first temperature sensor disposed in the first battery module; and determining, by the BMS, whether to turn on a first firefighting apparatus corresponding to the first battery cluster based on the concentration of the preset gas at each moment in the preset period and the temperature of the first battery module at each moment in the preset period, to extinguish a fire at a battery module in the energy-storage container.

2. The firefighting method for energy storage of claim 1, wherein determining whether to turn on the first firefighting apparatus corresponding to the first battery cluster based on the concentration of the preset gas at each moment in the preset period and the temperature of the first battery module at each moment in the preset period comprises:

determining whether the first battery module is abnormal, based on the concentration of the preset gas at each moment in the preset period and the temperature of the first battery module at each moment in the preset period;

cutting off power supply to the plurality of battery clusters, when the first battery module is abnormal; and on condition that the power supply to the plurality of battery clusters is cut off, when an increase in the temperature of the first battery module is detected through the first temperature sensor, determining that thermal runaway occurs in the first battery module, turning off the first exhaust fan, and controlling the first firefighting apparatus to release a fire extinguishing medium to the first battery cluster.

3. The firefighting method for energy storage of claim 2, wherein determining whether the first battery module is abnormal, based on the concentration of the preset gas at each moment in the preset period and the temperature of the first battery module at each moment in the preset period comprises:

determining that the first battery module is abnormal, when the concentration of the preset gas increases and a concentration at one moment in the preset period is greater than a first threshold; and/or determining a concentration change rate of the concentration of the preset gas at each moment in the preset period, based on the concentration of the preset gas at each moment in the preset period; and determining that the first battery module is abnormal, when the concentration change rate increases and a concentration change rate at one moment in the preset period is greater than a second threshold; and/or determining that the first battery module is abnormal, when the temperature of the first battery module increases and a temperature at one moment in the preset period is greater than a third threshold; and/or determining a temperature change rate of the temperature of the first battery module, based on the temperature of the first battery module at each moment in the preset period; and determining that the first battery module is abnormal, when the temperature change rate increases and a temperature change rate at one moment in the preset period is greater than a fourth threshold.

4. The firefighting method for energy storage of claim 3, wherein the firefighting system for energy storage further comprises a plurality of air pressure sensors and a plurality of pressure relief valves, and the plurality of air pressure sensors, the plurality of pressure relief valves, and the plurality of battery clusters are in one-to-one correspondence; and the method further comprises:

obtaining, by the BMS, an air pressure of the energy-storage container at each moment in the preset period through a first air pressure sensor in the plurality of air pressure sensors corresponding to the first battery cluster; and turning off, by the BMS, the first exhaust fan and turning on, by the BMS, a first pressure relief valve corresponding to the first battery cluster to reduce the air pressure of the energy-storage container, when the air pressure at any one moment is greater than a fifth threshold.

5. The firefighting method for energy storage of claim 2, wherein the firefighting system for energy storage further comprises a plurality of air pressure sensors and a plurality of pressure relief valves, and the plurality of air pressure sensors, the plurality of pressure relief valves, and the plurality of battery clusters are in one-to-one correspondence; and the method further comprises:

obtaining, by the BMS, an air pressure of the energy-storage container at each moment in the preset period through a first air pressure sensor in the plurality of air pressure sensors corresponding to the first battery cluster; and turning off, by the BMS, the first exhaust fan and turning on, by the BMS, a first pressure relief valve corresponding to the first battery cluster to reduce the air pressure of the energy-storage container, when the air pressure at any one moment is greater than a fifth threshold.

6. The firefighting method for energy storage of claim 1, wherein the firefighting system for energy storage further comprises a plurality of air pressure sensors and a plurality of pressure relief valves, and the plurality of air pressure sensors, the plurality of pressure relief valves, and the plurality of battery clusters are in one-to-one correspondence; and the method further comprises:

obtaining, by the BMS, an air pressure of the energy-storage container at each moment in the preset period through a first air pressure sensor in the plurality of air pressure sensors corresponding to the first battery cluster; and turning off, by the BMS, the first exhaust fan and turning on, by the BMS, a first pressure relief valve corresponding to the first battery cluster to reduce the air pressure of the energy-storage container, when the air pressure at any one moment is greater than a fifth threshold.

7. A firefighting system for energy storage, configured to perform the firefighting method for energy storage of claim 1, and comprising the plurality of temperature sensors, the plurality of gas detectors, the plurality of exhaust fans, the plurality of firefighting apparatuses, and the battery management system (BMS); wherein the plurality of battery clusters are disposed in the energy-storage container, and each of the plurality of battery clusters comprises the plurality of battery modules, wherein one gas detector and one temperature sensor are disposed in each of the plurality of battery modules; and the plurality of battery clusters, the plurality of exhaust fans, and the plurality of firefighting apparatuses are in one-to-one correspondence;

each of the plurality of gas detectors is configured to detect the preset gas;

the BMS is configured to turn on the first exhaust fan corresponding to the first battery cluster where the first battery module is disposed to exhaust the preset gas from the energy-storage container, when the first gas detector disposed in the first battery module detects the preset gas, wherein the first battery module is any one of the plurality of battery modules in the first battery cluster;

the BMS is configured to obtain the concentration of the preset gas at each moment in the preset period through the first gas detector and the second gas detector adjacent to the first gas detector, wherein the BMS is configured to:

obtain the first concentration of the preset gas detected by the first gas detector at each moment in the preset period and obtain the second concentration of the preset gas detected by the second gas detector at each moment;

obtain the first relative distance between the second gas detector and the first exhaust fan;

determine the wind speed corresponding to the second gas detector, based on the operating power of the first exhaust fan and the first relative distance between the second gas detector and the first exhaust fan;

determine the initial diffusion rate of the preset gas in the air, based on the molecular weight of the preset gas and the molecular weight of the air;

obtain the relative direction between the diffusion direction of the preset gas diffused to the second gas detector and the first exhaust fan, where the relative direction includes the opposite direction or the reverse direction of the opposite direction;

adjust the initial diffusion rate of the preset gas in the air based on the wind speed and the relative direction, to obtain the diffusion rate of the preset gas diffused to the second gas detector;

obtain the two-dimensional size of each of the plurality of battery modules and the second relative distance between the first gas detector and the second gas detector;

determine the diffusion concentration of the preset gas diffused to the second gas detector at each moment, based on the diffusion rate, the two-dimensional size of each of the plurality of battery modules, the second relative distance, and the second concentration; and determine the concentration of the preset gas at each moment in the preset period, based on the diffusion concentration of the preset gas diffused to the second gas detector at each moment and the first concentration of the preset gas;

the BMS is configured to obtain a temperature of the first battery module at each moment in the preset period through a first temperature sensor disposed in the first battery module; and the BMS is configured to determine whether to turn on a first firefighting apparatus corresponding to the first battery cluster based on the concentration of the preset gas at each moment in the preset period and the temperature of the first battery module at each moment in the preset period, to extinguish the fire at the battery module in the energy-storage container.

8. The firefighting system for energy storage of claim 7, wherein the BMS configured to determine whether to turn on the first firefighting apparatus corresponding to the first battery cluster based on the concentration of the preset gas at each moment in the preset period and the temperature of the first battery module at each moment in the preset period is configured to:

determine whether the first battery module is abnormal, based on the concentration of the preset gas at each moment in the preset period and the temperature of the first battery module at each moment in the preset period;

cut off power supply to the plurality of battery clusters, when the first battery module is abnormal; and on condition that the power supply to the plurality of battery clusters is cut off, when an increase in the temperature of the first battery module is detected through the first temperature sensor, determine that thermal runaway occurs in the first battery module, turn off the first exhaust fan, and control the first firefighting apparatus to release a fire extinguishing medium to the first battery cluster.

9. The firefighting system for energy storage of claim 8, wherein the BMS configured to determine whether the first battery module is abnormal, based on the concentration of the preset gas at each moment in the preset period and the temperature of the first battery module at each moment in the preset period is configured to:

determine that the first battery module is abnormal, when the concentration of the preset gas increases and a concentration at one moment in the preset period is greater than a first threshold; and/or determine a concentration change rate of the concentration of the preset gas at each moment in the preset period, based on the concentration of the preset gas at each moment in the preset period; and determining that the first battery module is abnormal, when the concentration change rate increases and a concentration change rate at one moment in the preset period is greater than a second threshold; and/or determine that the first battery module is abnormal, when the temperature of the first battery module increases and a temperature at one moment in the preset period is greater than a third threshold; and/or determine a temperature change rate of the temperature of the first battery module, based on the temperature of the first battery module at each moment in the preset period; and determining that the first battery module is abnormal, when the temperature change rate increases and a temperature change rate at one moment in the preset period is greater than a fourth threshold.

10. The firefighting system for energy storage of claim 9, wherein the firefighting system for energy storage further comprises a plurality of air pressure sensors and a plurality of pressure relief valves, and the plurality of air pressure sensors, the plurality of pressure relief valves, and the plurality of battery clusters are in one-to-one correspondence; and the BMS is further configured to:

obtain an air pressure of the energy-storage container at each moment in the preset period through a first air pressure sensor in the plurality of air pressure sensors corresponding to the first battery cluster; and turn off the first exhaust fan and turn on a first pressure relief valve corresponding to the first battery cluster to reduce the air pressure of the energy-storage container, when the air pressure at any one moment is greater than a fifth threshold.

11. The firefighting system for energy storage of claim 8, wherein the firefighting system for energy storage further comprises a plurality of air pressure sensors and a plurality of pressure relief valves, and the plurality of air pressure sensors, the plurality of pressure relief valves, and the plurality of battery clusters are in one-to-one correspondence; and the BMS is further configured to:

obtain an air pressure of the energy-storage container at each moment in the preset period through a first air pressure sensor in the plurality of air pressure sensors corresponding to the first battery cluster; and turn off the first exhaust fan and turn on a first pressure relief valve corresponding to the first battery cluster to reduce the air pressure of the energy-storage container, when the air pressure at any one moment is greater than a fifth threshold.

12. The firefighting system for energy storage of claim 7, wherein the firefighting system for energy storage further comprises a plurality of air pressure sensors and a plurality of pressure relief valves, and the plurality of air pressure sensors, the plurality of pressure relief valves, and the plurality of battery clusters are in one-to-one correspondence; and the BMS is further configured to:

obtain an air pressure of the energy-storage container at each moment in the preset period through a first air pressure sensor in the plurality of air pressure sensors corresponding to the first battery cluster; and turn off the first exhaust fan and turn on a first pressure relief valve corresponding to the first battery cluster to reduce the air pressure of the energy-storage container, when the air pressure at any one moment is greater than a fifth threshold.

13. A computer-readable storage medium, configured to store computer programs which, when executed by a processor, implement a firefighting method for energy storage, applied to a firefighting system for energy storage, wherein the firefighting system for energy storage comprises a plurality of temperature sensors, a plurality of gas detectors, a plurality of exhaust fans, a plurality of firefighting apparatuses, and a battery management system (BMS); a plurality of battery clusters are disposed in an energy-storage container, and each of the plurality of battery clusters comprises a plurality of battery modules, wherein one gas detector and one temperature sensor are disposed in each of the plurality of battery modules; the plurality of battery clusters, the plurality of exhaust fans, and the plurality of firefighting apparatuses are in one-to-one correspondence; and the method comprises:

turning on, by the BMS, a first exhaust fan corresponding to a first battery cluster where a first battery module is disposed to exhaust a preset gas from the energy-storage container, when a first gas detector disposed in the first battery module detects the preset gas, wherein the first battery module is any one of a plurality of battery modules in the first battery cluster;

obtaining, by the BMS, a concentration of the preset gas at each moment in a preset period through the first gas detector and a second gas detector adjacent to the first gas detector, wherein obtaining, by the BMS, the concentration of the preset gas at each moment in the preset period through the first gas detector and the second gas detector adjacent to the first gas detector comprises:

obtaining a first concentration of the preset gas detected by the first gas detector at each moment in the preset period and obtaining a second concentration of the preset gas detected by the second gas detector at each moment;

obtaining a first relative distance between the second gas detector and the first exhaust fan;

determining a wind speed corresponding to the second gas detector, based on an operating power of the first exhaust fan and the first relative distance between the second gas detector and the first exhaust fan;

determining an initial diffusion rate of the preset gas in air, based on molecular weight of the preset gas and molecular weight of the air;

obtaining a relative direction between a diffusion direction of the preset gas diffused to the second gas detector and the first exhaust fan, wherein the relative direction comprises an opposite direction or a reverse direction of the opposite direction;

adjusting the initial diffusion rate of the preset gas in the air based on the wind speed and the relative direction, to obtain a diffusion rate of the preset gas diffused to the second gas detector;

obtaining a two-dimensional size of each of the plurality of battery modules and a second relative distance between the first gas detector and the second gas detector;

determining the diffusion concentration of the preset gas diffused to the second gas detector at each moment, based on the diffusion rate, the two-dimensional size of each of the plurality of battery modules, the second relative distance, and the second concentration; and determining the concentration of the preset gas at each moment in the preset period, based on the diffusion concentration of the preset gas diffused to the second gas detector at each moment and the first concentration of the preset gas;

obtaining, by the BMS, a temperature of the first battery module at each moment in the preset period through a first temperature sensor disposed in the first battery module; and determining, by the BMS, whether to turn on a first firefighting apparatus corresponding to the first battery cluster based on the concentration of the preset gas at each moment in the preset period and the temperature of the first battery module at each moment in the preset period, to extinguish a fire at a battery module in the energy-storage container.

14. The computer-readable storage medium of claim 13, wherein the computer programs implementing determining whether to turn on the first firefighting apparatus corresponding to the first battery cluster based on the concentration of the preset gas at each moment in the preset period and the temperature of the first battery module at each moment in the preset period are executed by the computer to implement:

determining whether the first battery module is abnormal, based on the concentration of the preset gas at each moment in the preset period and the temperature of the first battery module at each moment in the preset period;

cutting off power supply to the plurality of battery clusters, when the first battery module is abnormal; and on condition that the power supply to the plurality of battery clusters is cut off, when an increase in the temperature of the first battery module is detected through the first temperature sensor, determining that thermal runaway occurs in the first battery module, turning off the first exhaust fan, and controlling the first firefighting apparatus to release a fire extinguishing medium to the first battery cluster.

15. The computer-readable storage medium of claim 14, wherein the computer programs implementing determining whether the first battery module is abnormal, based on the concentration of the preset gas at each moment in the preset period and the temperature of the first battery module at each moment in the preset period are executed by the computer to implement:

determining that the first battery module is abnormal, when the concentration of the preset gas increases and a concentration at one moment in the preset period is greater than a first threshold; and/or determining a concentration change rate of the concentration of the preset gas at each moment in the preset period, based on the concentration of the preset gas at each moment in the preset period; and determining that the first battery module is abnormal, when the concentration change rate increases and a concentration change rate at one moment in the preset period is greater than a second threshold; and/or determining that the first battery module is abnormal, when the temperature of the first battery module increases and a temperature at one moment in the preset period is greater than a third threshold; and/or determining a temperature change rate of the temperature of the first battery module, based on the temperature of the first battery module at each moment in the preset period; and determining that the first battery module is abnormal, when the temperature change rate increases and a temperature change rate at one moment in the preset period is greater than a fourth threshold.

16. The computer-readable storage medium of claim 15, wherein the firefighting system for energy storage further comprises a plurality of air pressure sensors and a plurality of pressure relief valves, and the plurality of air pressure sensors, the plurality of pressure relief valves, and the plurality of battery clusters are in one-to-one correspondence; and the computer programs executed by the computer further implement:

obtaining, by the BMS, an air pressure of the energy-storage container at each moment in the preset period through a first air pressure sensor in the plurality of air pressure sensors corresponding to the first battery cluster; and turning off, by the BMS, the first exhaust fan and turning on, by the BMS, a first pressure relief valve corresponding to the first battery cluster to reduce the air pressure of the energy-storage container, when the air pressure at any one moment is greater than a fifth threshold.

17. The computer-readable storage medium of claim 14, wherein the firefighting system for energy storage further comprises a plurality of air pressure sensors and a plurality of pressure relief valves, and the plurality of air pressure sensors, the plurality of pressure relief valves, and the plurality of battery clusters are in one-to-one correspondence; and the computer programs executed by the computer further implement:

obtaining, by the BMS, an air pressure of the energy-storage container at each moment in the preset period through a first air pressure sensor in the plurality of air pressure sensors corresponding to the first battery cluster; and turning off, by the BMS, the first exhaust fan and turning on, by the BMS, a first pressure relief valve corresponding to the first battery cluster to reduce the air pressure of the energy-storage container, when the air pressure at any one moment is greater than a fifth threshold.

18. The computer-readable storage medium of claim 13, wherein the firefighting system for energy storage further comprises a plurality of air pressure sensors and a plurality of pressure relief valves, and the plurality of air pressure sensors, the plurality of pressure relief valves, and the plurality of battery clusters are in one-to-one correspondence; and the computer programs executed by the computer further implement:

obtaining, by the BMS, an air pressure of the energy-storage container at each moment in the preset period through a first air pressure sensor in the plurality of air pressure sensors corresponding to the first battery cluster; and turning off, by the BMS, the first exhaust fan and turning on, by the BMS, a first pressure relief valve corresponding to the first battery cluster to reduce the air pressure of the energy-storage container, when the air pressure at any one moment is greater than a fifth threshold.

* * * * *